United States Patent [19]
Gartner

[11] 4,203,487
[45] May 20, 1980

[54] CLIMATIZING APPARATUS

[75] Inventor: Karl Gartner, Gundelfingen, Fed. Rep. of Germany

[73] Assignee: Firma Josef Gartner & Co., Gundelfingen, Fed. Rep. of Germany

[21] Appl. No.: 928,568

[22] Filed: Jul. 27, 1978

Related U.S. Application Data

[63] Continuation of Ser. No. 709,209, Jul. 27, 1976, abandoned.

[51] Int. Cl.² ............................ F24F 3/00; F24D 5/10
[52] U.S. Cl. ........................................ 165/50; 98/31;
98/40 C; 165/49; 165/53; 165/56; 165/183; 237/69
[58] Field of Search ................ 165/49, 50, 53, 56, 165/57, 59, 154, 169, 170, 183; 237/43, 69; 98/40 C, 31; 52/303

[56] References Cited

U.S. PATENT DOCUMENTS

| | | | |
|---|---|---|---|
| 1,301,589 | 4/1919 | Nuckols | 98/40 C |
| 1,963,786 | 6/1934 | Glenn | 165/50 |
| 2,210,960 | 8/1940 | Pierre | 237/69 |
| 2,298,250 | 10/1942 | Brown | 165/183 |
| 2,520,446 | 8/1950 | Thrush | 237/69 |
| 2,822,742 | 2/1958 | Ochs et al. | 98/40 C |
| 3,981,445 | 9/1976 | Custer | 98/31 |

FOREIGN PATENT DOCUMENTS

| | | | |
|---|---|---|---|
| 2020643 | 11/1971 | Fed. Rep. of Germany | 98/31 |
| 2132921 | 1/1973 | Fed. Rep. of Germany | 237/69 |
| 25046 | of 1898 | United Kingdom | 237/69 |

*Primary Examiner*—James C. Yeung
*Assistant Examiner*—Daniel J. O'Connor
*Attorney, Agent, or Firm*—Jerome P. Bloom

[57] ABSTRACT

Apparatus for climatizing a building comprising means including elements of a structural frame adapted to provide a portion of a facade for such building, at least a portion of said elements being hollow, said hollow elements being formed to provide for movement therethrough of fluid for supplying heat thereto or extracting heat therefrom, means for the delivery of fluid to and for the direction of fluid from said hollow elements, and said hollow elements being arranged for the mounting of facade elements to extend in bridging relation thereto and to be conditioned thereby.

18 Claims, 14 Drawing Figures

CLIMATIZING APPARATUS

This is a continuation of application Ser. No. 709,209 filed July 27, 1976, now abandoned.

BACKGROUND OF THE INVENTION

This invention concerns an improved method of and apparatus for the climatizing of a building. It has particular benefits in respect to externally located rooms and will be so described by way of illustration but not by way of limitation.

In accordance with the invention external rooms of a building are climatized with a facade comprising frame structure including hollow supports and hollow connectors, on which hollow supports or frame thereof facade elements, for example glass panes, railing, cover plates and the like, are applied, in essence, free of heat bridges or cold bridges.

The previously utilized climate systems are so-called induction systems. These systems have a number of drawbacks both in their use and construction. They comprise induction devices, one of which is placed in every room of the building in which the system is embodied, and each is connected with a central climate system by way of a multiplicity of pipes. The multiple pipe connections are necessary in order to provide the required forward and return path for the means used for heat transfer as well as a supply line for primary air. These prior art systems are further complicated by the fact there must be two systems for providing the primary air, since within the outer zones of a building the primary air must be supplied under a very high pressure and within the inner zones of the building air must be supplied under a low pressure. Moreover, the air discharge nozzle on every induction device must be so built that it is capable of functioning, simultaneously, to draw used air from the room in which it is located. A particular requirement is that the pressure of the primary air being delivered must be great enough to cause the air within the room being conditioned to be circulated at least six to seven times.

By reason of the multiplicity/of pipes or conduits required in the individual rooms not only is the construction per the prior art very complex but, since these pipes or conduits must be under cover, the rooms to which the system is applied must have relatively large construction heights. As will be obvious, the operation of the induction climate system requires the use of a very large amount of energy. A most objectionable feature of an induction system is that in the operation thereof any dirt existing in the individual rooms will be continuously stirred up in space.

A most important disadvantage of an induction climate system is that it is not capable of overcoming the problem of so-called radiation holes. A radiation hole is a wall region of a room the temperature of which differs substantially from the average room temperature. Typical radiation holes occur in such areas of a room as are walled by large glass window surfaces. To understand the importance of this, it must be understood that an individual located in a room radiates heat in all directions. In turn heat radiates back from the room walls onto the individual. The walls of a room, because of their heat storage capability will normally assume, the essence, room temperature. Where the heat radiation from these walls is uniform, an occupant of the room can be comfortable. However, where the walls of the room have radiation holes the heat radiation back to the individual occupant in such areas may be too little or too great, in which event the individual occupant can become uncomfortable.

A basic object of the present invention is to provide elements of a building with hollow support structure utilized in a manner to substantially eliminate the problem of radiation holes and to avoid a condition wherein the climatizing process causes dirt within a room to be picked up and whirled in space.

In an embodiment of the concepts of the present invention a preferred structure for mounting building facade elements is comprised of a frame including support elements certain of which are hollow and communicated with a delivery line or conduit and a return line or conduit to provide a frame structure through which there may be a continuing flow of heat transfer fluid. In preferred embodiments the frame structure will include both vertical support elements and tranversely disposed bar or beam elements which interconnect the vertical support elements with at least certain of the vertical support elements being hollow and certain of the transversely disposed bar or beam elements being hollow and preferably of steel. In any embodiment of the present invention it will be seen that the frame structure and the hollow elements thereof provide means through which a heat transfer fluid may be transported so that the structure may serve as a medium through which heat may be supplied to or drawn from a room bounded thereby.

The heat transfer fluid which is transported through the passages or chambers defined by the hollow support elements or segments of the structural frame may be either water or air or a combination thereof.

The invention apparatus has the advantage over that of the prior art in that the relatively large surfaces of the frame structure mounting the building facade elements, such as provided by its hollow vertical support elements and hollow transversely disposed beam or bar elements which interconnect the vertical supports, serve as highly efficient conductive mediums through which heat can be supplied to or carried away from a room, by reason of which to simply and effectively climatize the room. Since this climatizing system does not require separate induction devices and complex plumbing, there is no need for the buildings in which the system is installed to have the additional construction height such as necessitated for the installation of climatizing systems of the prior art. It is contemplated that inner glazing may be provided on the inner sides of the hollow supports embodied in the frame structure of the invention as well as on their outer sides. This means space between the panes in the window areas will be brought to the desired temperature easily and insures that in use of the invention system not only will radiation holes be eliminated in the areas of glass panes which are mounted thereto as facade elements but radiation holes will also be eliminated in the spaces between glass panes which are commonly mounted to the same hollow supports.

Another preferred embodiment provides that in certain of the hollow elements of the frame structure of the invention there can be placed at least one pipe having longitudinally extended ribs, which pipe is connected at one end to a delivery line or conduit and at the other end to a return line or conduit. In this instance the pipe will serve as a means for transporting one heat transfer fluid and thereby as a medium for supplying or carrying away heat while the hollow frame element or elements in which the pipe is inserted forms thereabout a passage through which air is conveyed. As the air moves over the longitudinally ribbed pipe conveying the heat transfer fluid within the frame structure, there is obviously a heat transfer as between the fluid and the pipe and the conveyed air, the material of the pipe serving as a heat transfer medium. In accordance with this embodiment of the invention hollow elements of the frame structure in which the pipe is embodied will be provided with slots or slits positioned to open towards the room to be climatized and at least one opening for air discharge will be provided in this room. With this embodiment of the invention at least some of the outlet openings defined by the slots or slits will be directed toward the inner side of the facade elements mounted to the frame structure to serve to cool or to heat these facade elements so as to avoid the formation thereon of condensation water and so as to prevent that they form radiation holes. Purposefully the ribbed pipes which conduct the heat transfer fluid are arranged to be free of contact with the inner wall surfaces of the hollow structural elements of the frame in which they are placed. In this way there is no contact with would provide a direct heat transfer as between the pipe and the frame structure. To simplify assembly, at least one of the walls of the hollow elements of the structural frame which mount the facade elements is removably applied. Moreover, such slits as are provided in the walls of the hollow elements of the frame structure which are innermost with reference to the facade elements are directed in a sense essentially at right angles to the facade elements.

In a further embodiment, in a functional field or region thereof, the frame structure of the invention may employ a longitudinally ribbed pipe in bottom side hollow frame elements which extend transversely of vertical supports bounding a room to be climatized. An air passage is defined about the pipe, in which case, as above described, the pipe will serve as a medium to transport fluid for producing a heat transfer as between the fluid in the pipe and the air about the pipe. The elements through which the said pipe is extended will have an opening or openings. These openings will be provided as slots or slits arranged to direct air to move in a sense upwardly of and between adjacent of the vertical support elements of the frame, from the bottom to the top of the inner surface of a connected facade element. With this arrangement of what constitutes a horizontal air passage in the frame structure, to one side of the room, whereon facade elements are provided by glass panes, one may cause a positive convection flow of air which is guided across the panes to appropriately heat or cool the same whereby to insure the avoidance of radiation holes and to preclude the formation of condensation water. At least one opening is provided for air discharge from the room being climatized. The arrangement is such to enable that the air be furnished from a low pressure air system.

As will be seen from the various embodiments of the invention herein described and illustrated the slots or slits which are provided in the hollow elements of the frame structure of the invention may be suitably positioned, preferably spaced and at right angles to connected facade elements, for optimal directed flow of any air discharged or blown from the hollow structure so that such air may flow along the side walls of the room and the hollow support elements in a manner to make possible a good heat transfer effect, such as required to obviate the problems noted with respect to the use of prior art climatizing systems.

Where the ribbed pipe is employed in horizontal or vertical air passages of the frame structure of the invention embodiments the longitudinal ribs thereof may be so fastened that in cross section they will have a star form and in longitudinal direction have a screw or helical form around the pipe. This arrangement of the ribs makes it possible that any air conveyed about the pipe will have a flow pattern that it moves in a relatively contained relation about the entire peripheral surface of the pipe. This arrangement enables a most effective heat transfer as between the fluid moving through the pipe and the air being conveyed thereabout.

The noted object of the invention is attained in another preferred embodiment of the invention which provides a first quickly responding system and a second slowly responding system for supplying heat to or extracting heat from the rooms of a building. This embodiment includes at least one pipe provided with longitudinal ribs arranged on the room side of the facade elements on every level of the building, in the region of the floors thereof. This pipe is connected to a delivery conduit and a return conduit to provide a flow passage for water which in transit therethrough serves to give up heat to or extract it from its surrounding environment. The pipe extends through a plurality of horizontally oriented hollow bar or beam elements positioned between and extending in a sense transversely to hollow vertical support elements through which the pipe also passes and which define thereabout an air passage in communication with a device for delivering air, under pressure. The vertical supports and horizontal bars serve as a frame to the outer side of which are secured facade elements such as glass panes. The horizontal bar or beam elements are provided with slots or slits on the room side of the facade elements and in the adjacent room there is a vent for discharge of air from within the room. The arrangement is such that the fluid in exit from the ribbed pipe will pass to and through the hollow vertical supports and other interconnecting hollow beam elements at essentially the vertical limits of the frame prior to finally exiting to the return conduit. The apparatus involved in the first quickly responding system is provided by the means including the ribbed pipe, the heat transfer fluid as it passes therethrough and the moving air which passes over the pipe and issues from the slot or slits in the horizontal bars or beams accommodating the ribbed pipe at the proper temperature to serve to provide an immediate climatizing influence. The coupling of the ribbed pipe to the hollow elements of the frame mounting the facade elements produces the second system in that there is further heat transfer as the water discharged from the ribbed pipe moves through the hollow elements the material of which accommodates heat transfer with its exterior environment, which includes the air discharged by way of said slots or slits. The climatizing so provided is directed against the hollow supports and the hollow beam elements which extend therebetween to function therewith and in respect to the water flowing therethrough in a manner to provide a secondary phase treatment or conditioning of the facade elements of the building, particularly to the room side thereof.

This last described apparatus of the invention has the advantage that the same is worked directly into the facade in a manner not only to conserve a considerable amount of space of a building, but to insure an avoidance of radiation holes. The consequence is an optimum climatizing attained in a manner previously not considered possible by the average man skilled in the art. The improvements in a climatizing operation achieved as described are to such a degree as to have come as a complete surprise. It has been found that the first system functions or responds very quickly as a consequence of the nominal volume of the pipe. By way of flowing warm or cold water in such pipe or by way of interruption in this flow there can be obtained very quickly the desired warm or cool air necessary for the climatizing process. Since on the other hand, the air flow resulting simultaneously assures positive convection on the outer side of the hollow elements of the frame structure as well as the glass surfaces of the panes forming facade elements which are mounted to the frame structure, and in view of the fact very large quantities of water and maintained in the hollow vertical supports, the second system provides as a part thereof a storage means which only very slowly permits a change of basic values involved, enabling thereby a controlled climatizing process. In addition there occurs in the use of this preferred embodiment, a heat transition by way of radiation, with high efficiency, as between the hollow frame elements, the glass panes and room air.

Incorporated to form a continuing part of the frame structure just described is a hollow beam segment providing an air discharge passage having a slot in the room side wall thereof which is parallel to the associated facade elements. The beam segment is located in the frame structure adjacent the floor area of the room being climatized and its interior is sealed from communication with the interior of the hollow elements which provide a path for the heat exchange fluid to flow from the ribbed pipe to the return conduit.

This last described embodiment of the invention has the advantage that with a triple air circulation per time unit within a room being climatized utilizing the apparatus of the invention, the same effect can be achieved as attained with a circulation seven times within the same time period necessary in the function of prior art induction systems. Moreover, whirling up of dust in the room in which the circulation is achieved is substantially eliminated. It is noted that the slot communicating the air discharge passage with the interior of the room being climatized provides for a vent of air which can be used in conjunction with a venting provided by a device in the ceiling in the room.

In further embodiments of the invention hollow supports mounting facade elements which must be conditioned to avoid radiation holes in the area thereof can have a considerably improved heat transfer capability with respect to such air as is moved thereacross in a positive flow. This may be achieved by securing parallel spaced ribs in a heat conductive relation to the walls of such supports which are at right angles to the facade elements which they mount. In combination with the ribbed supports there is applied between adjacent thereof, and in the plane thereof, a hollow beam at a level to the bottom of the facade elements mounted by such supports. This beam is designed to provide a passage for the flow of air, under pressure, and to include in a wall thereof a slot or slots at right angles to the associated facade elements. The ribs are so arranged to be parallel to the associated facade elements and the slot or slots provided in the beam thereunder are so positioned as to lie under the projected ribs and within the respective limits thereof. Where it is desired to enlarge the heat exchange surface of the hollow supports the ribs may be incorporated in a U-shaped cap-like structure which is placed over each vertical support from the room side thereof to position its side walls in respectively spaced parallel relation to the side walls of the underlying support. Some of the ribs incorporated in the cap-like wall structure project outwardly of and perpendicular to the outer surface of its side walls, which incorporate apertures intermediately thereof. Selective of the incorporated ribs have inwardly projected extensions designed to abut and form a conducting connection between the side walls of the cap-like structure and the side walls of the underlying hollow support. The arrangement is such to provide an outer heat transfer surface enlargement with reference to the hollow support enabling an even better climatizing of the rooms.

Air passages provided on the several floors of the building are connected in an advantageous manner with vertical air supply passages arranged in connection therewith so that an air speed of 4–6 m/s is made possible in every air passage.

With reference to the aforementioned embodiments of the invention wherein a dual climatizing system is achieved, the quickly responding system may be controlled by incorporating, in the connection line between the ribbed pipe and the hollow support to which the ribbed pipe discharges its contents for flow to the return line, a thermostat controlled valve.

The invention apparatus is particularly suitable for use in large contructions. In such constructions the facade of the building involved in the climatizing system is subdivided to provide in every floor or level thereof identical function fields of regions, each of which includes a fixed number of hollow support elements with surfaces of facade elements located therebetween, means defining a common air passage for connection with an air delivery means, and to the bottom of the structure defining such fields or regions a passage for discharge of air from the room being climatized. Also included in the means defining the common air passage is a pipe having longitudinally extending ribs arranged to discharge into a hollow support element by way of a thermostat controlled valve. Since the hollow support elements are interconnected by transversely extending frame elements, this will provide, in essence, a continuous flow of fluid to and through said hollow elements in passage of the fluid from the pipe to a return line.

In a special embodiment of the invention each function field or region consists of frame structure to which are applied facade means providing at least three adjoining facade surfaces. What may be considered the first facade surface is bounded at its upper end by a blind beam or connector element and a lower hollow beam is provided to form a passage for venting air from the room at a side of which the function field is embodied. The sides of the first facade surface are respectively bounded by hollow support elements one of which functions as part of a next adjoining function field or region and the other of which commonly bounds one side of the second facade surface forming part of the three adjoining surfaces in the described function field.

In association with each function field are means defining an air supply passage extending across the field at a level to bound the lower edges of portions of facade elements such as provided by glass panes forming portions of the facade surfaces. A delivery line is connected to this air supply passage and within said air supply passage is a pipe having longitudinally extending ribs. This pipe, which is adapted to carry a fluid utilized to supply heat to or to extract heat from the room bounded by the function field, is diverted adjacent the hollow support at the edge of the third facade surface in the function field which is most remote from said first facade surface to connect by way of a thermostat valve into a chamber in the lower end of this remote hollow support. This chamber is defined by insertion of a separating plate within the support, adjacent and spaced from its lower end. The arrangement is such to provide that the second and third facade surfaces are bounded by hollow supports and hollow connector elements, one of which is said remote hollow support, and the total thereof are in free and open communication except by way of limitation provided by said separator plate. The thermostat controlled discharge from said pipe is thus arranged to move to the lower end of the said remote support and to circulate through the elements which bound said first and second facade surfaces in passage to a return line.

To make possible a continuous heating or cooling system free of external disturbances such as flow failure and the like, the invention contemplates the use of a storage tank for preheated or pre-cooled water to be stored, to be used in the delivery thereof into a function field as and when required. A mixing valve may be interposed between the storage tank and the line for delivering the water into a function field and the return line for carrying water from the function field may be arranged to have a portion of such water delivered to the mixing value. Accordingly, by suitable adjustment of the mixing valve one can supply water to a function field at a regulated temperature.

There is provided, in an advantageous manner, a device for heating or cooling water returned from the function field, through which device a portion of the return water may be supplied to the aforementioned storage tank. The evaporator of a refrigerator machine can in this case be advantageously utilized to cool off the portion of the return water desired. Such an arrangement is especially advantageous for a climatizing installation in underdeveloped countries having hot-moist climates. If the water supply required in a building should break down for a long time, the building in which the cooling water is required to circulate in hollow supports thereof would warm up very quickly. When air should be introduced into the building, for example at 97% relative humidity, difficult condensation problems would naturally result. With the provision of the storage means and the associated structure as described, one can use portions of storage cooling water to mix with return water and thereby achieve in a simple manner a delivery of the necessary cooling water to the function fields in the building at a temperature of, for example, 14%C. This is not only more simple but better than if the water cooled in the evaporator were supplied directly to the water delivery lines connected to the function fields in the building. It is proposed that the quantity of water stored in the storage tanks in the system as described should amount to five to ten times the quantity of water circulating in the water circuit portion of the function fields of the climatizing system of the building. A sufficient cooling of the building may be maintained over a long period of time when power fails when for example return water from the climatizing system has a temperature of 18° C., and the temperature of the water located in the storage tank is 4° C., then water delivered has the temperature of 14° C.

With the apparatus in the foregoing system externally located rooms of a building can be climatized in an extremely simple and uncomplicated manner. For heating of the rooms water is supplied to the pipes provided in air passages at such a temperature that the temperature of the hollow supports will be somewhat above the desired room temperature while the air supplied to the air passages will have a temperature which lies below the desired room temperature. This has the advantage that if temperature disturbances should arise, for example in a room where suddenly a number of people enter or suddenly lamps are turned on, the desired room temperature can thereby be maintained as the thermostat controlled valve becomes closed and the transport of water through the pipe or pipes provided therefor is interrupted. Since the heat or the warmth which will be stored in the water in the ribbed pipe is quite small as a consequence of its small volume or mass, this warmth or heat is given off very quickly to the room in which the function field is embodied until the air in the room is cooled thereby to the desired value. Even should there be a non-responding thermostat, there occurs a dropping or lowering of the room temperature only in an extremely slow manner, since the air used in the climatizing process conveys heat or warmth from the hollow elements of the frame structure of the function field which comprise a large heat storage means in the example illustrated. This means that the cooling off of an especially endangered location, as for example a glass surface, and accordingly the formation of radiation holes, becomes effectively precluded.

In such rooms being climatized as have no temperature disturbances which may arise in the form of localized heat sources, the temperature of the air supplied for heating purposes can also be somewhat above the room temperature.

For cooling rooms, water supplied to the pipes in the air passages of a function field will be provided at such a temperature that the temperature in the hollow elements comprised in the function field will lie somewhat below the desired room temperature. The air is supplied, however, at a temperature contemplating temperature disturbances above the desired room temperature. By interrupting water flow in the pipes of the system, the warmer air which is immediately supplied will move with positive convection of the air along the somewhat cooler hollow elements of the function field to somewhat alleviate the temperature conditions in the room and thereby make possible a constancy of the desired room temperature. When no disturbances are contemplated in the rooms to be cooled, the air can be supplied at a temperature which in this case is also below the desired room temperature.

The foregoing statements show that the invention apparatus is especially suitable for both heating and cooling purposes by way of series connection in a climatizing installation of a quickly effective first system having a small heat capacity and a relatively slow effective second system having a larger heat capacity, in the use of which a quick compensation of localized temperature disturbances in any room becomes attained and as a result of which the constancy or base value of the room temperature can only be influenced very slowly. Finally attention is directed to the fact that as a consequence of the storage effect of the water in the field of the hollow elements comprised in a function field the facade elements supported thereby are maintained at a desired temperature in the summer on the sunny side since as a consequence of the large masses a good deal of heat or warmth can be stored. Additionally, as a consequence of the circulation of the water in the hollow elements of a function field there occurs a heat dissipation transporting heat to hollow element portions not located on the sunny side.

The invention system operates with high efficiency since the heat transfer by way of convection and by way of radiation are coupled to produce optimum results.

A large energy savings can be attained in use of the invention system outside operating hours due to the fact that while the water circulation in the function fields is maintained, the air circulation may be interrupted and the room temperature will be approximately maintained as a result thereof.

The accompanying drawings set forth further details of the present invention by way of example. In the drawings.

Figure 1:
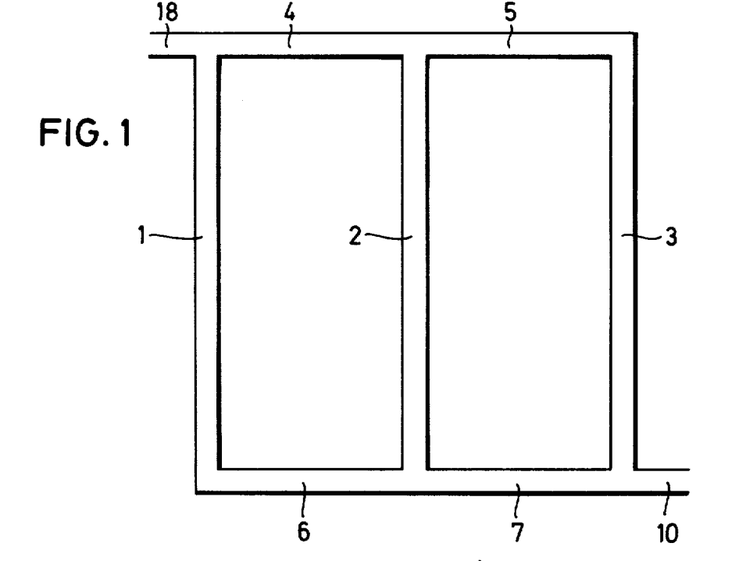
FIG. 1 is a schematic showing of a first embodiment of the concept of a climatizing system per the present invention.

FIG. 1 shows a function field or region of a facade in a building embodying the climatizing system of the invention consisting of three hollow vertical support elements 1, 2 and 3. These support elements are interconnected at the bottom by means of lower transversely extending beams or bar elements 6 and 7 and at the top by the upper transversely extending bar or beam elements 4 and 5. The transversely disposed elements 6 and 7 are hollow and capable of transporting and providing flow passage for fluid, as are the upper bar or beam segments 4 and 5. Connected into the circulation flow path defined by the hollow elements as described, at the juncture of the lower end of the support 3 and the element 7 is a delivery line or conduit 10. Similarly connected to the juncture of the top of the support 1 and the connected transverse beam 4 is a return line or conduit 18. It will of course be obvious that with the illustrated arrangement that the line 18 can serve as the delivery line and the line 10 can serve as a return line. In any case, a heated or cooled fluid, constituting a heat transfer fluid, can be supplied by way of the delivery line 10 to move to and through the hollow vertical support elements 1, 2 and 3 and the transversely extending bar or beam segments 4, 5, 6 and 7 to eventually exit from this function field by way of the return line 18. As the heated or cooled fluid moves through the elements 1 through 7 heat is delivered to or extracted from the room area adjacent to which this functional field is positioned, by way of the heat conductive material of which the hollow elements of the function field are formed, as a result of which the inside of the room bounded by the function field will be climatized by way of free convection. If the fluid transported through the hollow elements is heated sufficiently to warm the room, then the heat will be given off to the walls of the hollow elements and from the outer surfaces of the elements to the inside of the room. If cooling is to be effected the movement of the heat is reversed as to the direction of flow. In either case as the heat transfer fluid is moved continuously through the elements of the function field it will serve its purpose in a simple fashion and in a resultingly cooled or heated condition returned for further use in a manner and for such purposes as desired.

Figure 2:
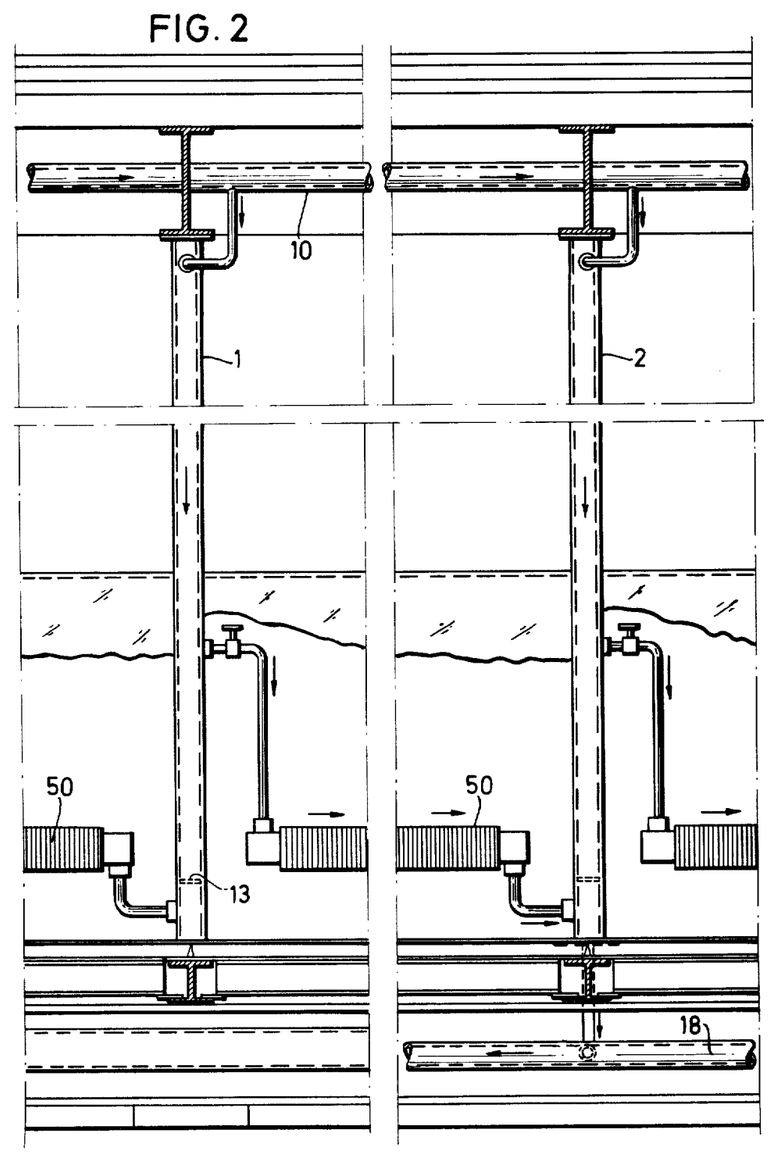
FIG. 2 is a schematic showing of a second embodiment.

In the embodiment of the invention illustrated in FIG. 2 a portion of a function field is shown to be comprised by frame structure bounding and defining one side of a room including hollow vertical strut elements 1 and 2 which are transversely spaced. Incorporated in each of the adjacent spaced hollow vertical supports, adjacent and spaced from the lower end thereof, is a transversely disposed plate segment 13 separating the hollow space within each vertical support into a vertically extended upper chamber above the plate 13 and a second chamber below the plate 13 which is of short vertical extent. Supported to extend transversely of and above the upper ends of the supports 1 and 2 is a fluid delivery line 10 branch lines of which are connected to respectively open into the top end of the upper chambers of each of the vertical supports. A return line 18 is shown to be located beneath the floor surface of the room area of the building which is bounded by the supports 1 and 2. The chambers below the plates 13 in each of the vertical supports 1 and 2 are connected by suitable piping to the return line 18. Interposed between the successively adjacent and transversely spaced vertical supports 1 and 2 is an essentially horizontally disposed warm water heater body 50 defining a flow passage the inlet end of which is communicated by suitable piping, in which there is interposed a control valve, with the upper chamber in the vertical support 1 intermediate the plate 13 and its upper vertical limit. The outlet end of the flow passage in the heater body 50 is connected by suitable piping to the space in the hollow vertical support 2 defining the chamber below the plate 13 therein. In using this arrangement for heating a room area, heated water may be directed from the delivery line or conduit 10 into the top of the upper chamber in the vertical support 1 and flow from this chamber into and through the heater body 50, in the course of which the heat of the delivered fluid becomes dissipated and guided away from the structure through which it passes in a free convection flow, particularly in the area of the facade element which extends between and bridges the outer side surfaces of the vertical supports 1 and 2. It will be seen that the free convection flow so provided will impinge upon the facade element at the inner side thereof and flow thereacross, in the process of which to heat the facade element and at the same time to supply the necessary heat to the room area bounded thereby. It should be readily apparent from FIG. 2 of the drawings that successively adjacent and relatively transversely spaced hollow vertical supports will be similarly communicated by means including a heater body 50.

Figure 3:
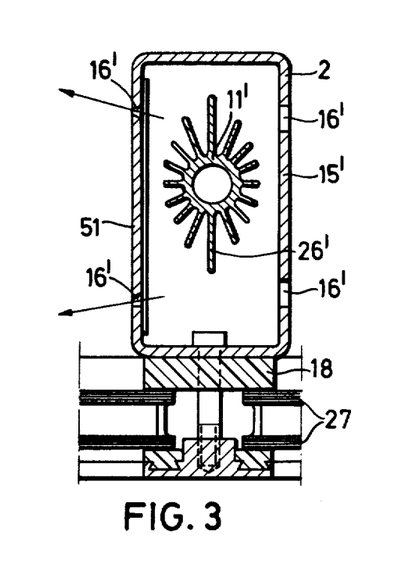
FIG. 3 is a fragmentary sectional view of a modified hollow support which may form part of a frame portion of a facade structure per the present invention.

FIG. 3 shows a segment of a frame structure of the invention demonstrating the use of a pipe 11' within hollow supports such as that illustrated. As shown, the pipe 11' is centrally located and free of contact with the inner wall surface of the hollow support. The pipe 11' includes a star shaped arrangement of longitudinally extending ribs 26' the projected extent of which is so limited that the ribs do not touch or engage the inner wall surface of the hollow support. In an invention system utilizing this feature the hollow supports 2 are connected to an air conveyor device for delivery therethrough of air under pressure, which moves exteriorly and longitudinally of the pipe means 11 and the ribs 26'. There is delivered to and through the pipe 11' a heat transfer fluid which is either heated or cooled, as a result of which the air conveyed longitudinally of the exterior of the pipe means 11 becomes warmed or cooled in a heat transfer process the nature of which should be readily apparent. As seen in FIG. 3 the side walls of the hollow support 2 which are at right angles to glass panes 27 secured to the outermost wall surface thereof include slots 16 at least one of which is directed to provide that the warmed or cooled air created in passage of air over the pipe 11' will be discharged against the glass panes 27. The panes 27 are secured to the hollow support means by a device 18 which is of an insulating character. With an arrangement so provided there will be created in space a directed positive convection flow of heating or cooling air, which air is directed also against the panes 27. It should be understood, of course, that the invention contemplates that the pipes 11' will be placed in the suitable hollow members of the structural frame of the invention in each functional field thereof and in a manner to insure that in all cases the heating or cooling air delivered from the vertical support in which the pipe 11' is embodied will have at least a portion thereof initially and directly discharge against the facade element which is intended to be heated or cooled in a manner thereby to avoid radiation holes.

In the embodiment shown in FIG. 3 the side wall of this hollow support 2 designated as 51 is intended to be provided with an access to the pipe 11'.

Figure 4:
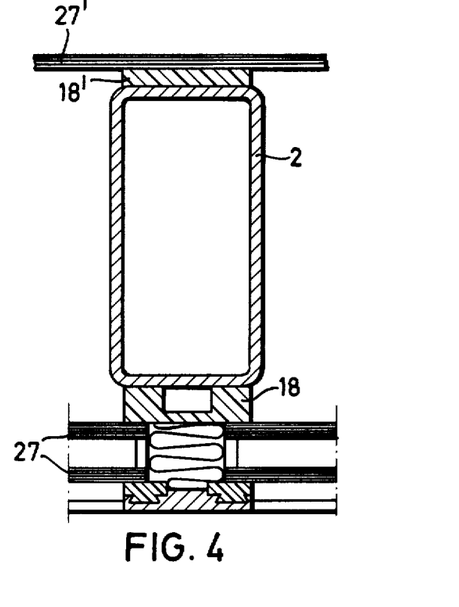
FIG. 4 illustrates a section of a hollow support mounting inner and outer facade elements, in this case in the form of panes of glass.

In an arrangement illustrated in FIG. 4 of the drawings, there shown is a hollow vertical support element 2 wherein the facade elements in the form of glass panes 27 which are in adjacent side by side relation are commonly mounted in secured relation to the outer face of support 2 by an insulator-type connector device 18. On the opposite or inner face of the support 2 is mounted a further glass means 27', an insulating element 18' being interposed between the innermost surface of the element 2 and the outermost surface of the glass 27', which is arranged in parallel spaced relation to the glass panes 27. In effect, since the glass panes 27 will bridge the hollow elements defining a function field in the system of the invention at the outer side thereof and the inner faces of the hollow elements defining a function field will be bridged by an inner glass pane or panes 27', there will be created, between the inner and outer panes, and bounded by a rectangular frame of hollow elements in the function field, a space. Thus, when heated or cooled heat transfer fluid is transported through the hollow elements defining a function field, such as the element 2 illustrated in FIG. 4, the side walls of the hollow elements will serve to provide for heat transfer as between the air in the hollow elements and that in the sealed spaces bounded thereby. It should be obvious that in a case such as this the structure avoids not only the formation of a radiation hole in the area of the glass panes but it avoids condensation being formed on the panes.

Figure 5:
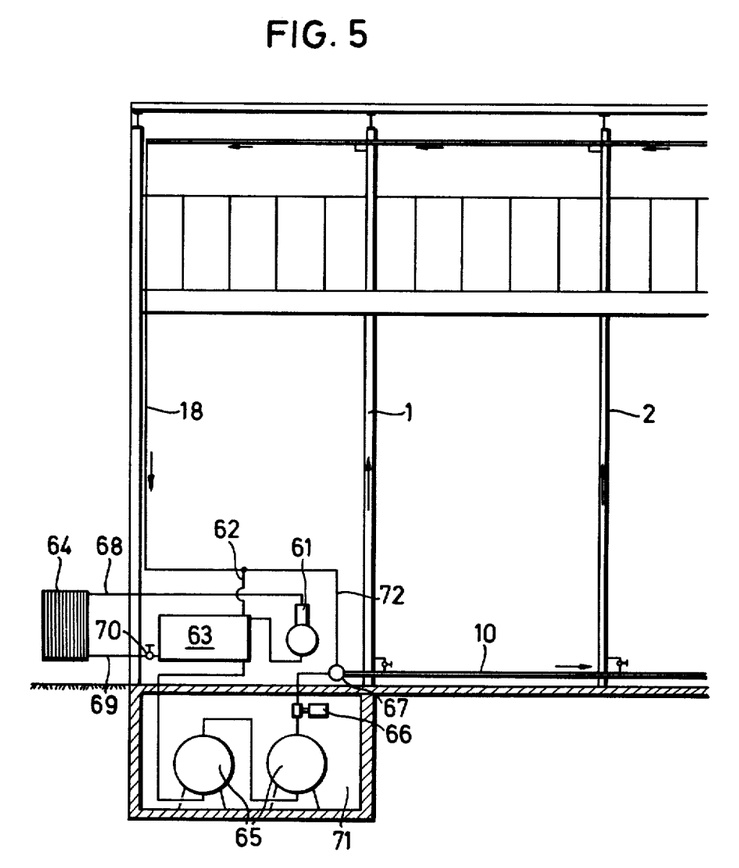
FIG. 5 is a schematic showing of an invention embodiment which utilizes a storage tank.

The embodiment illustrated in FIG. 5 of the drawings is especially suitable for climatizing rooms by way of cooling. As shown in FIG. 5, a delivery conduit 10 is positioned to extend transversely to hollow vertical support elements of the frame structure of the invention, only elements 1 and 2 of which are shown. The delivery line 10 is connected by way of branch lines, in which there are imposed suitable valve means, to communicate the interior of the delivery line with the interior of the hollow chamber defined in each case by the vertical supports, adjacent the lower end thereof. The chambers defined by these vertical supports such as 1 and 2 are each suitably connected by piping so as to provide for discharge of fluid therefrom at the top thereof to a common return line 18. The return line 18, as illustrated, branches into a first conduit 62 and a second conduit 72. The discharge end of the conduit 72 is connected by way of a mixing valve 67 to the inlet end of the delivery line 10. In association with the structure illustrated, in an underground room or chamber 71, are two storage tanks 65 which are connected by suitable piping to be series related. The branch conduit 62 is extended to an evaporator 63 and from the evaporator 63 to open into the first storage tank of the series related tanks 65. The second of the storage tanks 65 is communicated by way of a line incorporating a pump 66 with the inlet end of the delivery line 10 by way of a connection thereto through the mixing valve 67. The evaporator 63 forms part of a refrigerating system including a compressor 61 connected by way of a pressure line 68 with an air cooled condenser 64, located outside the building being climatized, which is connected in turn to the evaporator 63. The latter is connected by way of a conduit with a suction line of the compressor 61. With the arrangement provided there can be suitable mixing at the valve 67 of chilled or cold water, which is delivered to and stored in the tank 65, with so much of the return water delivered by way of the branch 72 as desired, to fit the particular needs of the climatizing operation. For example, in use of the refrigerating system as illustrated, return water flowing at 18° C. in conduit 62 can be cooled off in the evaporator 63 and delivered to storage tanks 65 at a temperature of 4° C. When water is pumped from the second of the storage tanks 65 in series to the valve 67 it can there be mixed with so much return water as to raise the temperature thereof to 15° C. and at that temperature the mixture so provided is delivered by way of the line 10 to move to and through the vertical supports such as 1 and 2 illustrated, in the process of which the walls of the supports provide for extraction by the flowing cold water of heat from the interior of the room bounded by the vertical supports.

In this particular embodiment of the invention the tanks 65 provide a large cold storage means facilitating the maintenance of cooling water at a reasonable temperature for a considerable amount of time during current failure. These storage tanks are particularly utilized when the rooms of a building being climatized suddenly have very great warm masses of air brought therein which must be cooled off and which must be kept at a comfortable temperature when the building outer temperature is relatively high.

Figure 6:
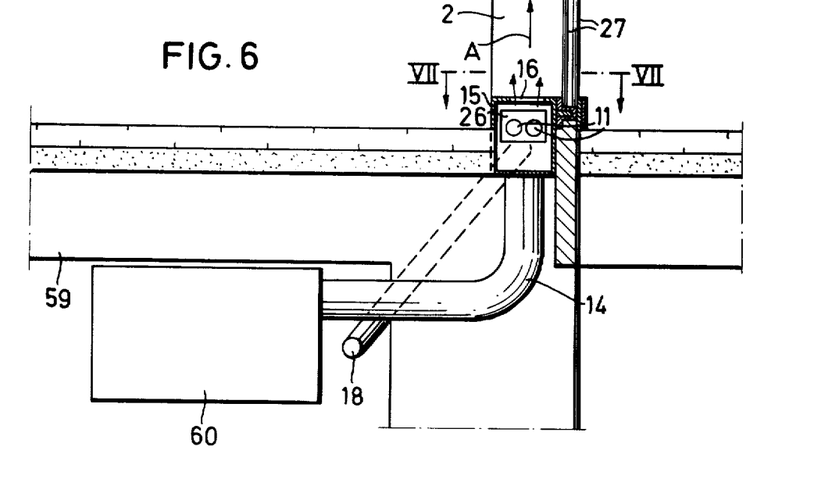
FIG. 6 is a schematic view, taken in longitudinal section, of a transverse bar or beam forming an air passage in a frame structure per the present invention.
Figure 7:
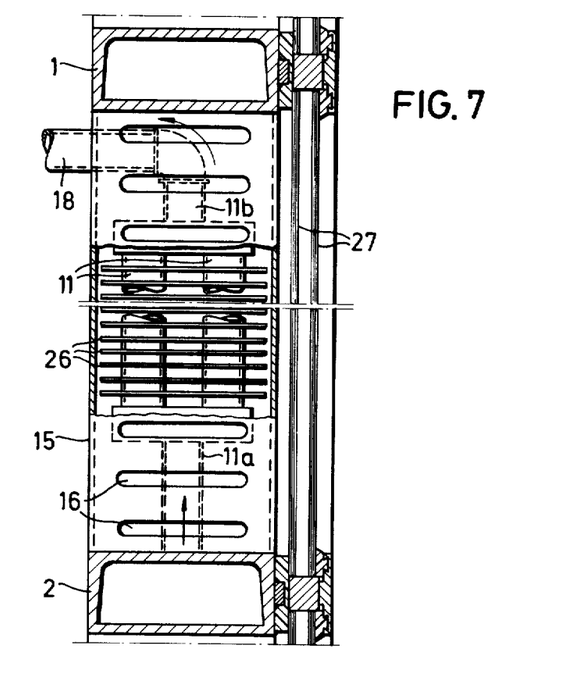
FIG. 7 is a sectional view taken along line VII—VII of FIG. 6.

Referring now to the embodiment shown in FIGS. 6 and 7 in the drawings, there illustrated is a part of a function field in a system in accordance with the invention which includes hollow vertical support elements 1 and 2 interconnected, at a location which would be adjacent to the lower limit of a facade element facing a room being climatized, by a hollow beam or bar element defining an air passage 15. In this case, the hollow vertical support 2 serves as a vehicle for transporting a fluid for heat transfer purposes which communicates with a pipe or tube 11a positioned in and at one end of the element defining the air passage 15. Within this air passage the pipe 11a branches into two pipe segments 11 which commonly empty into a return line 18 by way of a common adapter and a common discharge pipe 11b. The air passage 15 is communicated with a blower 60 arranged below the floor level of the room being climatized. As may be seen with reference to FIGS. 6 and 7, insulator connectors secured to the outermost surface portions of the vertical supports 1 and 2 serve as mediums for mounting facade elements 27, which are glass panes, to extend between and in bridging relation to the vertical supports and between pertinent transversely extending elements which together with the vertical supports frame the inner face of the glass panes. In the case illustrated ribs 26 are connected to extend from the outer periphery of the pipes 11 in a closely spaced parallel relation, oriented generally at right angles to the inner surface of the panes 27.

The upper wall section of the beam or bar segment defining the air passage 15 is provided with a series of slots 16 which are in lines parallel to each other and to the ribs 26, spaced the length thereof. As will be seen, air delivered into the beam or bar segment about the ribbed pipes 11 will in passage to and through the return line 18 shown in FIG. 6 move out of the passage 15 by way of the slots 16 and vertically of the innermost surface of the panes 27 and across the space between the vertical supports 1 and 2, the lateral extent thereof. Thus, the air discharged which has been suitably brought to a desired temperature in passage over the pipes 11a, 11 and 11b will flow both longitudinally of the walls of the hollow supports 1 and 2 and longitudinally of the inner side of the facade created by the structure illustrated. Note that the air flow longitudinally of the glass panes 27 is represented by an arrow A. It will of course be obvious that the structure in each functional area of the climatizing system will be similarly arranged so as to provide for an even and uniform treatment of the facade bounding the external rooms of the building.

Figure 8:
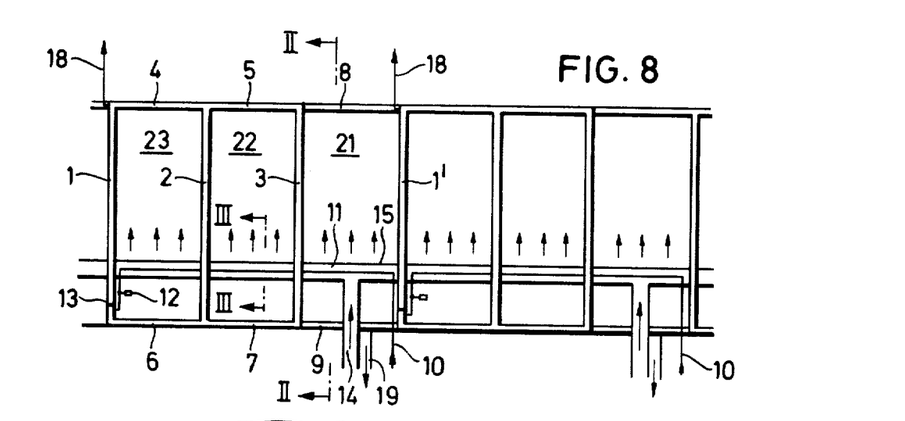
FIG. 8 is a schematic showing of a portion of a climatizing system including two fields or regions of a building facade arranged in side by side relation.

In FIG. 8 a function field or region of a facade is shown to consist of elements comprised of hollow vertical supports 1, 2 and 3 arranged in a side by side laterally spaced relation as well as the hollow vertical support 1' of the next adjoining functional field which would include, similarly, hollow vertical support elements 1', 2' and 3'. In the first functional field illustrated, the upper ends of the vertical supports 1 and 2 are bridged by a transversely extending hollow structural element in the form of a beam or a bar 4 communicated with a similar element 5 which extends between and bridges the upper ends of the vertical supports 2 and 3. Also, the lower ends of the elements 1 and 2 are transversely bridged by hollow beam or bar segment 6 communicating at one end with the lower end of the space defined by the vertical support 1. The opposite end of the element 6 is in open and direct communication with the directly aligned similar element 7 which bridges the lower ends of the support elements 2 and 3. It should be noted that there is provided interiorly of the hollow vertical support 1 adjacent and spaced from the lower end thereof, as in FIG. 2, a plate 13 which divides the space in the vertical support 1 into an upper vertically extended chamber and a lower chamber of short vertical extent. The latter communicates with the space in the elements 6 and 7 and thereby with the space in the lower ends of the vertical elements 2 and 3 with which the elements 6 and 7 are in free and open communication. The upper ends of the elements 2 and 3 are similarly in free and open communication with the space defined in the hollow elements 4 and 5. With the arrangement provided, for purposes of this description it may be considered that a facade element or elements will be applied to the outermost surface of the frame structure portion defined by the elements 1, 2, 4 and 6 and the facade element will provide an inner surface identified as 23. A second facade surface 22 is similarly created in the area bounded by the hollow elements 2, 3, 5 and 7. A third facade surface 21 is formed in the area bounded by the hollow vertical support element 3 and the hollow vertical support element 1' forming part of the next adjoining function field. The upper limit of this third facade surface 21 is defined by a blind tie bar or beam element 8 and its lower limit by a hollow bar or beam element 9 the function of which is different from that of the elements 6 and 7. This will be further described.

Figures 9, 10:
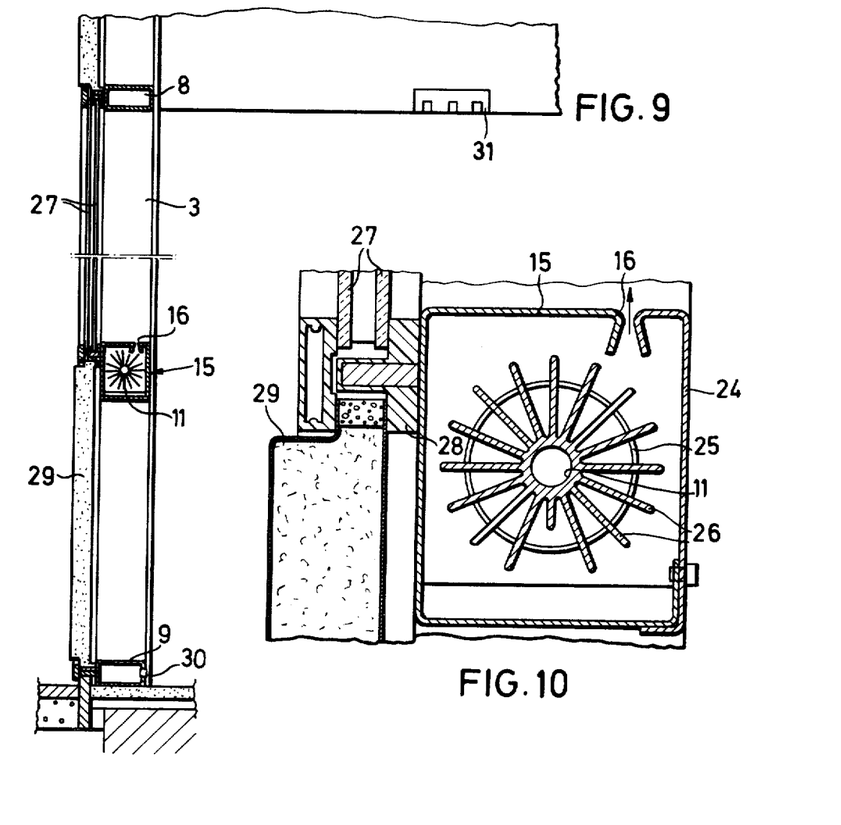
FIG. 9 is a section taken longitudinally of the line II—II of FIG. 8.
FIG. 10 is a section taken longitudinally of line III—III of FIG. 8.
Figure 11:
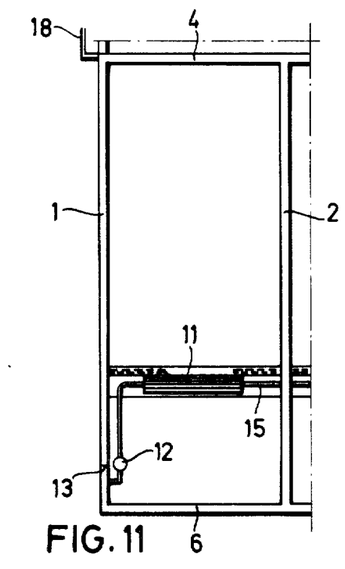
FIG. 11 shows in detail a use of a thermostat control valve in an invention system.

As apparent from FIGS. 9 and 10 of the drawings, two glass panes 27 are held to form each facade surface and secured by means of insulating connectors 28 onto the outer or facade side surfaces of the vertical supports, between vertically spaced bounding wall segments which may be of pre-cast concrete or other suitable materials resistant to ready heat transfer. As seen in cross section in FIG. 9, the facade structure including the frame structure of the invention forms an outer wall surface of a room the vertical limits of which correspond to the vertical limits of the function field. Intermediate the vertical limits of and disposed transverse to the vertical support elements is a hollow beam-like structure, there being one segment thereof between each adjacent pair of vertical supports. In their composite, these segments, by means of end related connector pipe means 25 extending through intervening vertical supports form a horizontally extending air passage 15. As will be seen in FIG. 10, every segment of the structure defining the air passage 15 has a removable wall portion 24 on the room side thereof. In the uppermost surface of each segment, between each adjacent pair of vertical supports, there is formed a nozzle-like longitudinally extending air exit 16. Centered within and to extend longitudinally of the passage 15, spaced from the walls thereof, is a pipe 11. In space between adjacent vertical supports the pipe 11 is provided with longitudinally extending ribs which are arranged about the pipe in a star form, the ribs radiating outward of the outer periphery of the pipe. At the end of the pipe 11 which is adjacent to the vertical support 1 it is diverted and extended to have its discharge extremity connected into the lower end of the vertical support, into the lower chamber thereof defined below the separating plate or wall 13. Inserted in the pipe line 11 immediately prior to its connection into the lower chamber of the vertical support 1 is a valve 12. The opposite or inlet end of the pipe 11 is connected to a delivery conduit 10. Noting FIG. 8, there is a delivery line 14 for air to be introduced into the structure 15 which defines an air flow passage about the pipe 11 which extends across the so-called function field illustrated. A return line 18 is connected to have its inlet end communicate with the interior of the hollow elements 1, 2, 3, 4, 5, 6 and 7 at the juncture of the elements 1 and 4. It is here noted that the valve 12 is a thermostat type valve.

It will be seen from the showing in FIGS. 8–10 that water which may be heated or cooled for heat transfer purposes will be delivered by way of the line 10 to pass through the pipe 11 and by way of the valve 12 into the chamber in the lower end of the hollow support 1 and, from there, through the entire area of the building facade defined by support elements 1, 2 and 3 and the connecting elements 6, 7, 5 and 4, to eventually be drawn or directed to and through the return line 18. The water so routed from the delivery line 10, having been previously heated or cooled, will through the medium of the ribbed pipe 11 provide for heat transfer as between the water and the air channelled through the air delivery passage formed by the structure 15. In the process portions of the heated or cooled air will escape through the nozzle-like slots 16 to move upwardly of the facade surfaces 21, 22 and 23 and in contacting relation to the hollow support elements 1, 2, 3 and 1'. When this air serves its conditioning function to heat or cool the facade surfaces which it contacts, it will be carried away, as shown in FIG. 9, by way of a vent 31 in the ceiling structure of the room being climatized. Noting FIG. 9, the element 9 which is sealed from communication with the interior of the vertical support elements 3 and 1' includes a slot 30 in the side thereof facing inwardly of the room being climatized. This slot provides an exit for air discharging from the room being climatized. Such air, upon moving into the member 9, will exit therefrom by way of a discharge line 19. The discharge lines 19 of the various function fields comprised in a climatizing system in accordance with the invention are commonly routed to a collecting conduit leading to a device in which heat exchange takes place between this used air being discharged and fresh air being supplied to the system from outside the building. After being subjected to this heat exchange the fresh air will be supplied to the respective delivery lines 14 for the respective function fields involved. In a similar manner the delivery lines 10 for the respective function fields and the return lines 18 are also connected to the collecting conduits to serve similar purposes.

Figure 12:
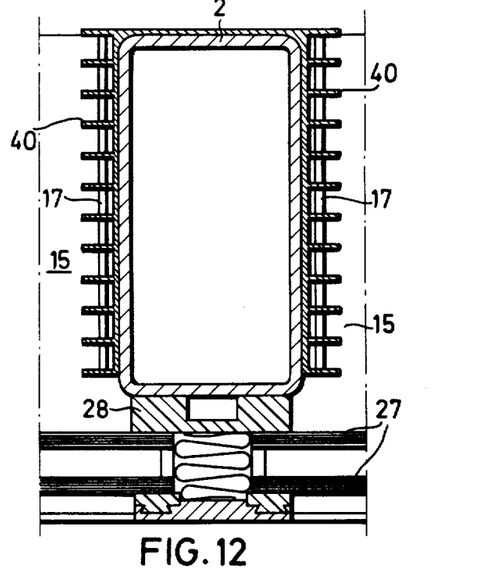
FIG. 12 shows, in cross section, details of a hollow strut or support included in an embodiment of a frame structure per the invention.
Figure 13:
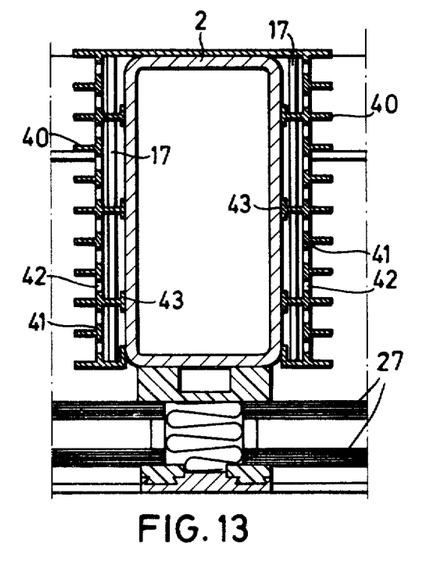
FIG. 13 shows a second embodiment of a hollow strut or support in a view similar to that of FIG. 12.
Figure 14:
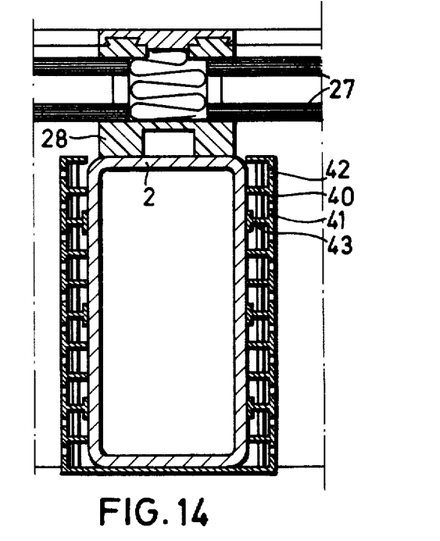
FIG. 14 shows a third embodiment of a hollow strut or support in a view similar to that of FIG. 13.

FIGS. 12 to 14 show specially desirable construction for the hollow vertical supports as represented by a support 2 there illustrated. In FIG. 12, which is a view in cross section of the support 2 from above a hollow beam structure 15 for conveying air about a pipe 11 therein, for example as shown in FIG. 8, the hollow support 2 is encased in a U-shaped sleeve which provides on the walls of the support, a right angles to the facade, a series of parallel perpendicularly projected ribs. Immediately under the ribs and intermediate the vertical extremities thereof are slots 17 in the structure 15, which slots are at right angles to the glass panes 27. The arrangement is such that any air blown out of the slots 17 will flow longitudinally of the ribs 40 which enhance the heat transfer from the hollow support represented by the element 2 into the environment or surrounding locations.

An enlargement of the external rib-like sleeve structure for the element 2 is shown in FIG. 13. In this case also, the ribs are embodied in a sleeve-like structure enclosing the three sides of the vertical support 2 to the inner side of the fascade elements defined by the window panes 27. As may be seen, the lateral sides of this sleeve-like structure encasing the element 2 are wall elements 41 which extend in parallel spaced relation to the adjacent sides of the element 2 and connected therewith in a heat conductive manner by spacing or support ribs 43. The spaces between the element 2 and the respective wall elements 41 each define chambers exits from which are provided by openings 42 in the wall elements 41. Projected from the outermost surfaces of the wall elements 41 in a sense perpendicular thereto and to the sides of the element 2 are ribs 40. With the arrangement here provided the slots 17 opening from the interior of an air conveying conduit 15 enable that air under pressure be forced from the conduit and between the side walls 41 and the adjacent side surfaces of the element 2 to enhance its ability to produce a heat transfer effect with respect to the contents of the element 2 and this air will escape thereafter by way of openings 42 to pass along and between the ribs 40.

In the embodiment shown in FIG. 14, in contrast to the arrangement in FIG. 13, the ribs are directly only inwardly from the wall elements 41. The wall elements 41 have apertures intermediately of such ribs for escape of air to the exterior of the structure so provided.

The invention, for example, is set forth in further detail by the following examples pertaining to an embodiment of the structure of the invention having a facade field or region according to FIG. 8.

EXAMPLE 1: Heating

Thermoplane plates are used as facade elements having a heat passage resistance of 0.172 m$^2$h grd C/kcal. The heat transfer surface provided by the hollow vertical support elements and the transversely connected hollow bar or beam elements has an exposed area of 2.64 m$^2$. The heat transfer surface of the ribbed pipe amounts to 3.8 m$^2$. Air is supplied to the air passage defined by the structure 15 in a quantity flow of 630 m$^3$/h. The temperature outside of the room being climatized is $-6.8°$ C. The heating water supplied under these conditions by way of the delivery conduit to the ribbed pipe has a temperature of 54° C. (150 l/h) and leaves the ribbed pipe with a temperature of 40° C. The heating water with this temperature enters into the space defined by the hollow vertical support elements and the transversely connected hollow bar elements and on discharge from the space to the return line has a temperature of 28° C. The temperature of the hollow vertical elements drops in the flow direction from 38° C. to 35° C. The air is supplied to the air passage with a temperature of 7.9° C. and is discharged out of the slots with a temperature between 29.2° and 23.1° C. In space there is a resulting temperature of 19.5° C. The temperature of the glass surface at the room side is 17° C. and the temperature at the outer surface of the thermopane plates is 5.7° C. From this data there can be calculated that the heat supplied by way of the ribbed pipe to the chamber or room is only nominally greater than the heat quantity given off from the frame structure comprised of the hollow vertical supports and their interconnecting transversely disposed hollow bars or beams.

EXAMPLE 2: Cooling

Thermoplane plates are used in this case as in the Example 1 having the same heat passage resistance. The cooling surface provided by the frame structure comprised of the hollow vertical supports and the interconnecting transversely disposed beam or bar elements has an area of 2.64 m². The air quantity supplied to the room amounts to 300 m³/h and the outer temperature is 44.3° C. When cooling water used is delivered at a flow of 164 l/h with a delivery temperature of 14.4° C., it discharges from the ribbed pipes at a temperature of 15.3° C. and at that temperature enters the frame structure comprised of the hollow vertical supports and the hollow interconnecting bar or beam elements. The water leaving the frame structure has a return temperature of 18.2° C. and the exposed surface temperature of the frame changes in the direction of the return from 16.6° C. to 17.6° C. There results a room temperature of 25.5° C. producing a temperature on the room side of the glass which is 29.7° C. There is brought about a cold delivery to the outside amounting to 68 kcal/h as well as a room side cooling output of 407 kcal/h. The heat passage number or figure from supports and structure surrounding the thermopane can be calculated at 17.4 kcal/m² grd C.

The embodiments of the invention in which an exclusive property or priviledge is claimed are defined as follows:

1. Apparatus for embodiment in the wall structure of a building to provide therein a system for heating and/or cooling one or more interior room areas, which wall structure includes one or more facade elements bounding a room area, said apparatus being applied to be bridged and/or covered by the one or more facade elements and including conduit means arranged to extend crosswise to the one or more facade elements, said conduit means being constructed to define separate passages for separate movement therethrough of a first and a second fluid and to provide means for heat transfer between said fluids, the one of said passages of said conduit means receiving said first fluid being adapted for connection to means which pre-condition and deliver said first fluid thereto at a predetermined temperature level and to provide for the initial entry of said first fluid to said system to afford a controlled heat exchange between said fluids while said first fluid is within the limits of said cross-wise conduit means, a frame including hollow elements segments of which provide heat transfer means arranged to have their interior in communication with each other and in following relation to said one of said separate passages which first receives said first fluid into said system, said hollow segments being arranged to form a direct continuation of said one said passage and to direct said first fluid in a path peripheral to a portion or portions of the one or more facade elements which are in bridging and/or covering relation thereto, and means for directing said second fluid from its separate passage as provided in said cross-wise conduit means to induce it to move to, over and adjacent the bridging and/or covering facade elements to bridge it or them with said second fluid the temperature of which has been adjusted by said heat exchange with said first fluid, to provide thereby a first rapidly acting control of the temperature of the room area bounded by said one or more facade elements, the said cross-wise conduit means thus providing means for the first introduction of both said first fluid and said second fluid to the system comprised of said cross-wise conduit means and said frame and the initial interfunction of said fluids to form a first part of said climatizing system and said hollow segments of said frame which receive and carry said first fluid from said one passage of said cross-wise conduit means providing a second more slowly acting base part of said climatizing system.

2. Apparatus as in claim 1 wherein said frame has the hollow segments thereof, at least in part, comprised of structural supports embodied in and forming part of said building structure.

3. Apparatus as in claim 1 wherein said hollow segments include vertically oriented transversely spaced beams to which insulating means are applied for the mounting of the bridging and/or covering facade element or elements in a non-conductive relation thereto, and said beams are arranged in an exposed relation to said second fluid as it is directed to, over and adjacent surface portions of the facade element or elements which lie therebetween.

4. Apparatus as in claim 1 wherein said cross-wise conduit means are interconnected with and form a bridging part of said frame.

5. Apparatus as in claim 1 wherein both said separate passages for said first and said second fluids are provided interiorly of a beam structure which extends transversely of said frame.

6. Apparatus as in claim 5 wherein said one passage is defined by a pipe-like structure formed of heat transfer material which extends through the interior of said transversely extending beam structure, said separate passage for said second fluid is formed about said pipe structure within the limits of said transversely extending beam structure and said pipe-like structure and said transversely extending beam structure form thereby said conduit means.

7. Apparatus as in claim 6 wherein, within the limits of said transversely extending beam structure, said pipe-like structure has external longitudinally extended ribs.

8. Apparatus as in any one of claims 1–7 wherein one of said hollow segments has an opening for exit of said first fluid subsequent to its initial and following heat exchange function and pre-conditioning means are connected with said exit and provide means for receiving and adjusting the temperature of the exiting first fluid, at least in part, and returning said first fluid to said system, once it is adjusted to the desired temperature level, to said one passage of said cross-wise conduit means for recycling and continuing heat exchange, first with said second fluid at its point of entry to said conduit means, at which point said second fluid initially enters said system, and then with said hollow segments of said frame.

9. Apparatus as in claim 1 wherein said hollow segments include vertically oriented transversely spaced beams and at least one horizontal cross beam, relatively projected ribs are provided on the exterior surface of said vertically oriented beams to extend parallel to an interior surface portion of the facade element or elements which extend in bridging and/or covering relation to said frame and said horizontal beam defines the portion of said conduit means which receives said second fluid and includes one or more slots oriented generally perpendicular to and in line with at least a portion of said ribs to provide said means for directing said second fluid arranged in a manner to provide for heat exchange between said second fluid, said ribs and the vertical beams from which said ribs project.

10. Apparatus according to claim 1 for application in a building wherein its wall structure includes the facade element or elements for each floor of the building, and said apparatus is divided into function regions each of which comprises one said frame arranged to mount a plurality of adjoining facade elements all except one of which is bounded by a plurality of said hollow elements interiors of which are in communication with each other and said one passage and said one of which is bounded at what constitutes an extremity thereof by a hollow element in the form of a beam segment which is sealed from the other hollow elements of the function region of which it forms a part and said sealed hollow beam segment provides a return passage for used air drawn from or escaping from the room area which is bounded by said function region.

11. Apparatus as in claim 1 wherein said frame includes a portion of said hollow elements in the form of vertically extending beams which include external ribs extending longitudinally thereof and another portion of said frame includes horizontal beams at least one of which embodies said separate passages and includes slots in line with said ribs, said slots providing means for directing said second fluid in a path to move to, over and in heat exchanging relation to said ribs.

12. Apparatus as in claim 11 wherein said ribs are embodied in caps for said vertical beams which extend vertically thereof and include a portion of said ribs as spacers between said caps and said vertical beams and said slots are in line with and perpendicular to the direction of said spacer portions of said ribs.

13. Climatizing apparatus as in claim 12 wherein said caps have openings in the wall thereof between said spacers.

14. Apparatus as in claim 7 wherein said ribs define spirally formed channels.

15. A climatizing system for a room or building comprising hollow elements including building support elements to and/or over which facade elements and/or other wall structure is applied to bound the interior of the room or building, at least a portion of said hollow elements being constructed and arranged to define a circulation path for a first fluid which bounds at least one section of the building wall structure which bounds in turn a room area or areas to be climatized, said portion of said hollow elements being constructed and arranged to provide for a heat exchange relation thereof with said first fluid, first of said hollow elements providing for the initial entrance of said first fluid to said path and forming a passage by way of which said first fluid the temperature of which has been prestablished is first introduced to said path and another of said hollow elements providing the terminal portion of said path and including an outlet by means of which said first fluid is discharged from said path, means for passing a second fluid in heat exchanging relation to said first fluid as said first fluid is first introduced to said path, means for directing said second fluid from its heat exchanging relation to said first fluid in said first of said hollow elements to disperse adjacent and over portions of said hollow elements which define said circulation path and a surface of the section of the wall structure which they bound and by which they are covered or bridged, said second fluid thereby providing a quickly functioning control of the temperature of the area or areas bounded by said one section of said wall structure and the first said fluid being arranged to function together with the hollow elements through which it is passed from said first of said hollow elements to said exit from said path to provide a basic and more slowly functioning control of the temperature of the area or areas bounded thereby together with or in absence of the function of said second fluid.

16. A climatizing system as in claim 15 wherein said first said hollow element is arranged to provide in passage of said first said fluid therethrough to have a substantial differential in temperature from the temperature of the following of said hollow elements effected by the passage of said first fluid therethrough.

17. A method of climatizing rooms of a building embodying one or more facade elements in wall structure bounding a room thereof including the steps of providing a frame within said room wall structure to be covered and/or bridged by the facade element or elements, providing that at least a portion of the segments of said frame are hollow and interconnected to define a circulation path extending vertically of and transverse of the facade element or elements, bridging said frame with conduit means providing separate passages which respectively serve for introduction and passage of a first and a second fluid, one adjacent the other, one of which passages communicates with the interior of said hollow segments defining said circulation path which follow said one passage in said path, passing said first fluid the temperature of which has been pre-set at a desired level to move in entry to said conduit means first to and through said one of said passages in a passing heat exchanging relation to said second fluid introduced in an adjacent second of said separated passages and then through said circulation path and discharging said second fluid from said second of said separated passages to flow to, over and adjacent surface portions of the facade element or elements, to provide a two part climatizing system, one part of which is provided by a major heat exchange between said fluids and the direction of said second fluid the temperature of which has been adjusted by said major heat exchange to flow to, over and adjacent the said facade element or elements which are in bridging and/or covering relation to said frame and the other part of which is slow acting and comprised of the means defining said one passage and said hollow frame segments which together therewith define a circulation path for said first fluid and a lesser heat exchange between said first fluid and said hollow frame segments.

18. Apparatus for climatizing externally located rooms of a building with a facade including a structural frame comprising hollow vertical supports and hollow cross beams on which facade elements are applied, in essence free of heat or cold bridges, segments of said hollow supports and beams in each room being interconnected in a predetermined manner to define a flow path for a liquid between a supply means for the liquid and a means for directing the liquid from said flow path, and at least one convector pipe functionally associated with at least one of said beams and hollow supports in each room, said pipe being provided with ribs and also serving as part of said flow path and being surrounded by an air channel in one of said cross beams which extends transversely between adjacent hollow vertical supports, said air channel being connected to an air delivery means and there being at least one opening from said air channel for air to discharge into a room being climatized and at least one air extracting means provided in said room, characterized in that said hollow vertical supports and beams interconnected to define said flow path for said liquid are commonly connected to said means for directing said liquid therefrom and arranged to receive the liquid for which they define a flow path from said convector pipe and are constructed and arranged together with the liquid moving through said flow path to provide a slowly responding base load system for supplying heat to or extracting heat from the room with which they are associated and said convector pipe and the portion of said hollow cross beams which forms thereabout said air channel serve for initial entry to said structural frame of air from said delivery means, which air moves about said pipe and the liquid which is supplied to said pipe from said supply means at a predetermined temperature level, thereby to provide in the relation of said convector pipe and said portion of said hollow cross beams in which it is embodied a fast responding system for controlling the temperature within said room in correpondence with the respective temperatures of said liquid and said air as first supplied and delivered into said structural frame and means defining a thermostat controlled valve located in said liquid flow path for controlling the flow of liquid into and through said structural frame.

* * * * *